United States Patent
Cerda, Jr. et al.

(10) Patent No.: US 8,335,807 B1
(45) Date of Patent: Dec. 18, 2012

(54) FILE DISTRIBUTION SYSTEM AND METHOD

(75) Inventors: Salvador Cerda, Jr., Peculiar, MO (US); Lyle Thomas Bertz, Lees Summit, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 1868 days.

(21) Appl. No.: 10/929,305

(22) Filed: Aug. 30, 2004

(51) Int. Cl.
G06F 17/30 (2006.01)
(52) U.S. Cl. ......... 707/827; 707/821; 709/201; 709/217
(58) Field of Classification Search .................. None
See application file for complete search history.

(56) References Cited

U.S. PATENT DOCUMENTS

| | | | | |
|---|---|---|---|---|
| 5,751,968 A | | 5/1998 | Cohen | |
| 5,933,834 A | * | 8/1999 | Aichelen | 707/103 R |
| 6,003,045 A | | 12/1999 | Freitas et al. | |
| 6,029,168 A | * | 2/2000 | Frey | 707/10 |
| 6,049,804 A | * | 4/2000 | Burgess et al. | 707/100 |
| 6,105,029 A | | 8/2000 | Maddalozzo, Jr. et al. | |
| 6,499,039 B1 | * | 12/2002 | Venkatesh et al. | 707/204 |
| 6,502,166 B1 | * | 12/2002 | Cassidy | 711/114 |
| 6,502,216 B1 | * | 12/2002 | Takano | 714/738 |
| 6,651,133 B2 | * | 11/2003 | Moore et al. | 711/102 |
| 6,691,166 B1 | | 2/2004 | Gasior et al. | |
| 2002/0019934 A1 | | 2/2002 | Ishizaki | |
| 2002/0118215 A1 | * | 8/2002 | Ball et al. | 345/619 |
| 2002/0133491 A1 | * | 9/2002 | Sim et al. | 707/10 |
| 2002/0138504 A1 | * | 9/2002 | Yano et al. | 707/204 |
| 2002/0156840 A1 | * | 10/2002 | Ulrich et al. | 709/203 |
| 2002/0194209 A1 | * | 12/2002 | Bolosky et al. | 707/205 |
| 2003/0004922 A1 | | 1/2003 | Schmidt et al. | |
| 2003/0004947 A1 | * | 1/2003 | Coverston | 707/9 |
| 2003/0018871 A1 | * | 1/2003 | March et al. | 711/173 |
| 2003/0023821 A1 | * | 1/2003 | March et al. | 711/154 |
| 2003/0046260 A1 | * | 3/2003 | Satyanarayanan et al. | 707/1 |
| 2003/0120685 A1 | * | 6/2003 | Duncombe et al. | 707/200 |
| 2003/0135514 A1 | * | 7/2003 | Patel et al. | 707/102 |
| 2003/0140051 A1 | * | 7/2003 | Fujiwara et al. | 707/100 |
| 2003/0167439 A1 | * | 9/2003 | Talagala et al. | 714/770 |
| 2004/0002934 A1 | * | 1/2004 | Taulbee et al. | 707/1 |
| 2004/0107314 A1 | * | 6/2004 | Kim et al. | 711/114 |
| 2004/0139125 A1 | * | 7/2004 | Strassburg et al. | 707/202 |
| 2004/0143575 A1 | * | 7/2004 | Cherkasova | 707/10 |
| 2004/0143576 A1 | * | 7/2004 | Cherkasova | 707/10 |
| 2004/0143595 A1 | * | 7/2004 | Cherkasova | 707/104.1 |
| 2004/0143607 A1 | * | 7/2004 | Beck | 707/201 |
| 2004/0153479 A1 | * | 8/2004 | Mikesell et al. | 707/200 |
| 2004/0205387 A1 | * | 10/2004 | Kleiman et al. | 714/6 |
| 2005/0005193 A1 | * | 1/2005 | Nakagawa et al. | 714/6 |
| 2005/0097270 A1 | * | 5/2005 | Kleiman et al. | 711/114 |
| 2005/0108240 A1 | * | 5/2005 | Bolosky et al. | 707/9 |
| 2005/0120078 A1 | * | 6/2005 | Kazar et al. | 709/203 |
| 2005/0240725 A1 | * | 10/2005 | Robinson et al. | 711/114 |
| 2007/0271350 A1 | * | 11/2007 | Kazar et al. | 709/214 |

* cited by examiner

Primary Examiner — Apu Mofiz

(57) ABSTRACT

A file distribution system is provided. The file distribution system includes a communication interface configured to communicate with a plurality of storage devices, to receive a file from a file source, and to transfer two or more file portions to two or more storage devices of the plurality of storage devices. The file distribution system further includes a processing system coupled to the communication interface, with the processing system being configured to receive the file from the communication interface, divide at least part of the file into the two or more file portions, and distribute the two or more file portions to the two or more storage devices through the communication interface. The two or more storage devices correspond to the two or more file portions. Each storage device of the two or more storage devices is separate from all other storage devices of the two or more storage devices.

49 Claims, 7 Drawing Sheets

FILE DISTRIBUTION SYSTEM AND METHOD

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to a file distribution system and method, and in particular, to a file distribution system and method that divide and distribute a file.

2. Description of the Prior Art

Data security is a subject of continuing interest in the field of computers and digital communications. The widespread use of computer networks and communication networks has led to large numbers of file transfers between locations. In addition, the widespread use of computer networks and communication networks has resulted in the use of larger and larger amounts of offsite storage, wherein data files are warehoused at storage facilities, including specialized storage facilities. Offsite storage is typically used to store large amounts of data, including corporate records, governmental records, and personal records. Such large amounts of digital storage are routinely held in offsite storage facilities for economical retrieval, such as for mass retrieval and batch processing. These storage facilities therefore hold massive quantities of sensitive and valuable information.

The rise of computer usage and computer literacy has also corresponded with a rise in computer misuse and data theft. In the prior art, it has become very common to use some encryption scheme in order to prevent unauthorized or malicious access to data and to prevent the theft of stored information.

The use of encryption to protect stored files has drawbacks, however. Encryption requires significant processing power. Encryption and decryption of large files requires significant time. Highly secure encryption (i.e., encryption using keys having large numbers of bits, such as 64 bit or 128 bit encryption) requires significantly more processing power and time than simple and less secure encryption. Encryption can increase the size of a file. Encryption requires a key or keys to accomplish, and therefore requires the transmission of or the acquisition of proper keys for encrypting and decrypting. Encryption software and keys are complex and expensive.

SUMMARY OF THE INVENTION

A file distribution system is provided according to an embodiment of the invention. The file distribution system comprises a communication interface configured to communicate with a plurality of storage devices, to receive a file from a file source, and to transfer two or more file portions to two or more storage devices of the plurality of storage devices. The file distribution system further comprises a processing system coupled to the communication interface, with the processing system being configured to receive the file from the communication interface, divide at least part of the file into the two or more file portions, and distribute the two or more file portions to the two or more storage devices through the communication interface. The two or more storage devices correspond to the two or more file portions. Each storage device of the two or more storage devices is separate from all other storage devices of the two or more storage devices.

A file distribution method is provided according to an embodiment of the invention. The method comprises receiving a file from a file source, dividing at least part of the file into two or more file portions, and distributing the two or more file portions to two or more corresponding storage devices. Each storage device of the two or more storage devices is separate from all other storage devices of the two or more storage devices.

A file distribution method is provided according to an embodiment of the invention. The method comprises receiving a file from a file source, forming at least a portion of the file into a block of data, dividing the block of data into two or more file portions, and distributing the two or more file portions to two or more corresponding storage devices. Each storage device of the two or more storage devices is separate from all other storage devices of the two or more storage devices.

A file distribution method is provided according to an embodiment of the invention. The method comprises receiving a file from a file source, forming at least a portion of the file into a block of data, slicing the block of data into two or more file slices corresponding to the two or more storage devices, and distributing the two or more file slices to the two or more storage devices. The distribution in some embodiments is performed in such a manner that contiguous bits of incoming data are not stored on the same storage device. Each storage device of the two or more storage devices is separate from all other storage devices of the two or more storage devices.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
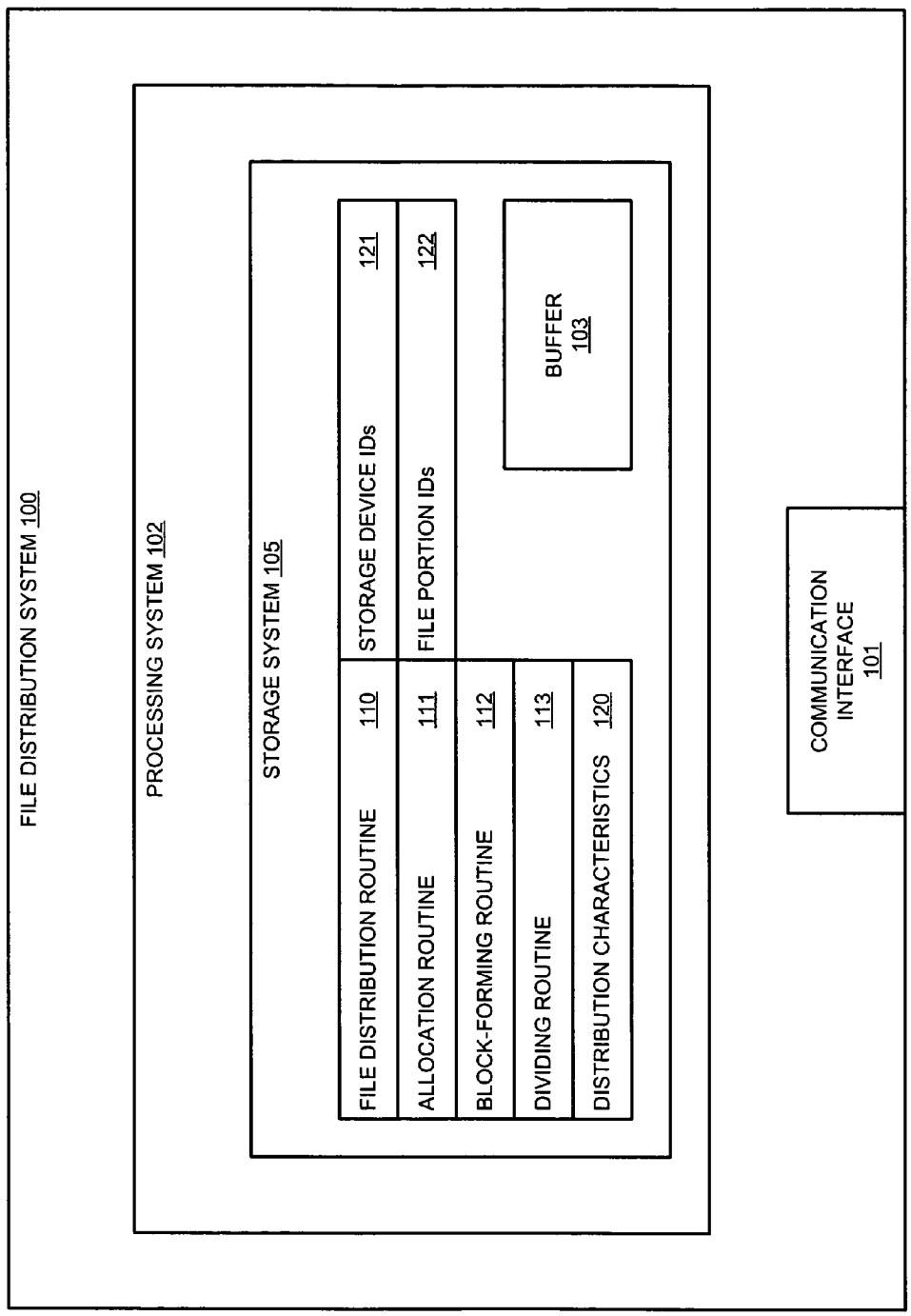
FIG. 1 shows a file distribution system according to an embodiment of the invention.

FIG. 1 shows a file distribution system 100 according to an embodiment of the invention. The file distribution system 100 includes a communication interface 101 coupled to a processing system 102. The processing system 102 includes a storage system 105, with the storage system 105 optionally including a buffer 103.

Figure 5:
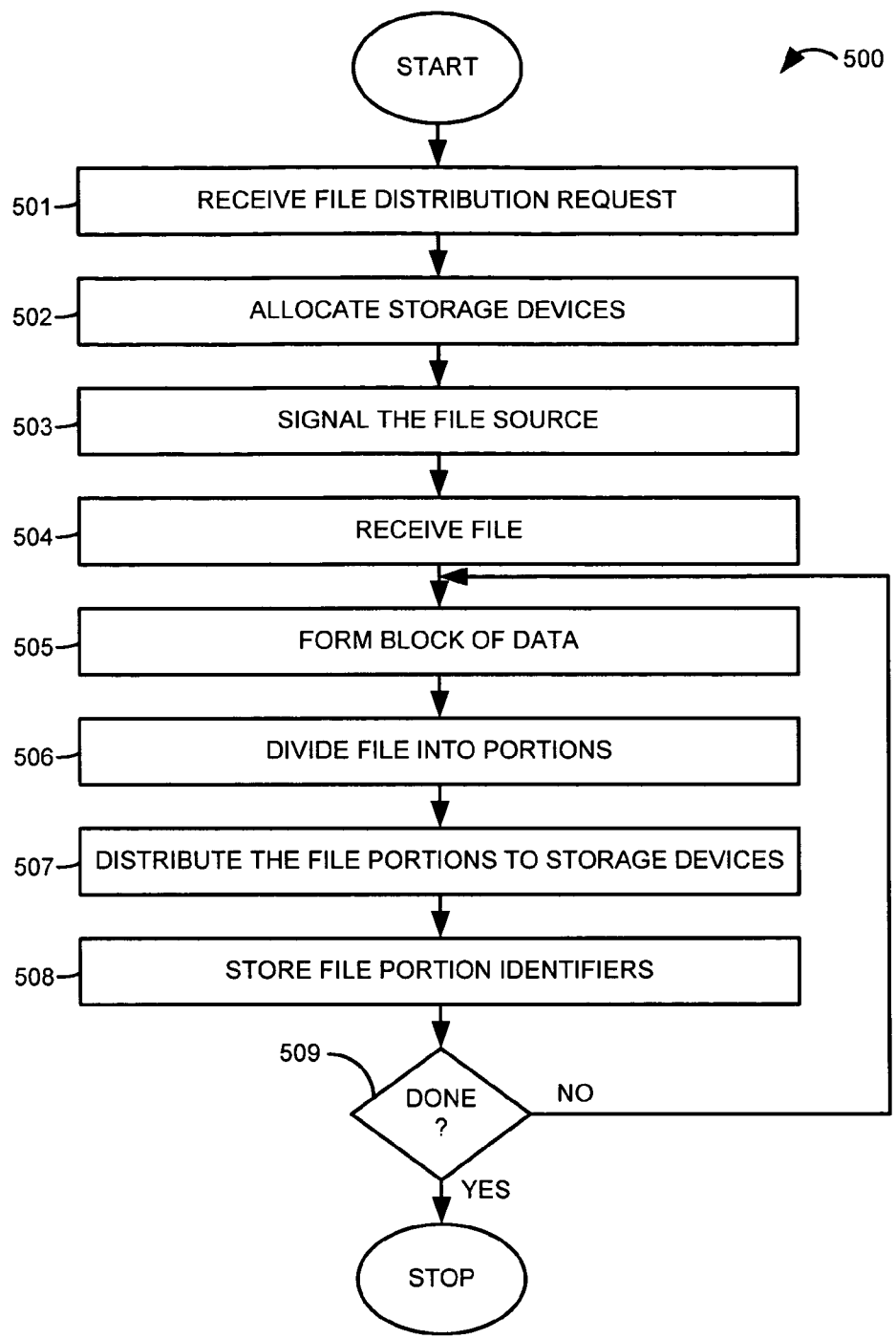
FIG. 5 is a flowchart of a file distribution method according to an embodiment of the invention.

The file distribution system 100 can comprise a component of a communication network or can communicate with other devices over some manner of communication network (see FIG. 5, for example). The file distribution system 100 distributes a file among two or more storage devices (see FIG. 2 and the accompanying discussion). Each storage device stores only a portion or portions of the file. The file distribution system 100 subsequently sends distribution information to the file source at the completion of the file distribution operation.

A file can be distributed for security purposes, for example. By dividing the file into two or more file portions and distributing the file portions over various storage devices, including separate storage devices, physically separate storage devices, and geographically separate storage devices, the ability to copy or steal a file is greatly reduced.

Each file portion of the two or more file portions can be of an equal size. However, the file can be divided into unequal portions, if desired.

The number of file portions can be equal to the number of storage devices used to store the file portions. Alternatively, the number of file portions can exceed the number of storage devices, wherein a storage device stores two or more non-contiguous file portions. For example, if two storage devices are being used, the file can be divided into four file portions, wherein the first storage device stores file portions 1 and 3 and wherein the second storage device stores file portions 2 and 4.

When the file is to be recovered, the file source requests the distributed file from the file distribution system 100 and provides the distribution information to the file distribution system 100. The file distribution system 100 then requests the file portions from the applicable storage devices, receives the file portions, re-assembles the file portions into the file and in the order as specified by the distribution information, and provides the re-assembled file to the file source.

It should be understood that the distributing can be performed in many ways. In one embodiment, the file distribution system 100 can receive a bitstream and can iteratively distribute bits, sets of bits, bytes, words, etc., of data between the storage devices. In another embodiment, the file distribution system 100 receives a file from a file source, divides at least part of the file into two or more file portions, and distributes the two or more file portions to two or more corresponding storage devices. In yet another embodiment, the file distribution system 100 receives a file from a file source, forms at least a portion of the file into a block of data, such as by transforming sequential sections of the at least a portion of the file into a plurality of rows of the block of data, divides the block of data into two or more file portions, and distributes the two or more file portions to two or more corresponding storage devices. In yet another embodiment, the file distribution system 100 receives a file from a file source, forms at least a portion of the file into a block of data, slices the block of data into two or more file slices corresponding to the two or more storage devices, and distributes the two or more file slices to the two or more storage devices. Each storage device of the two or more storage devices is separate from all other storage devices of the two or more storage devices.

The communication interface 101 enables communications with other electronic devices, such as computer networks and communication networks, and enables communications with other computers, computer devices, or network devices. The communication interface 101 is configured to transmit and receive files, such as digital data files.

The processing system 102 controls general operations of the file distribution system 100. The processing system 102 can comprise a computer microprocessor, logic circuit, or some other processing device. The processing system 102 can be distributed among multiple processing devices. The processing system 102 retrieves and executes a file distribution routine 110 from the storage system 105. The file distribution routine 110 can comprise an application program, firmware, or some other form of machine-readable processing instructions.

The storage system 105 can comprise a disk, tape, integrated circuit, or some other memory device. The storage system 105 can be distributed among multiple memory devices. The storage system 105 can comprise an integral component of the processing system 102 or can comprise an associated storage device or devices. The storage system 105 stores software routines, settings and data, temporary working data, etc., for the processing system 102. In one embodiment, the storage system 105 stores the file distribution routine 110, an allocation routine 111, a block-forming routine 112, a dividing routine 113, distribution characteristics 120, two or more storage device IDs 121, and two or more file portion IDs 122.

In addition, the storage system 105 can include the buffer 103. The buffer 103 comprises a data store, and can be used to store incoming and/or outgoing data. The buffer 103 can store digital data before, during, and after the processing of the data. In one embodiment, the buffer 103 can comprise a component of the storage system 105. Alternatively, the buffer 103 can comprise a separate storage.

The allocation routine 111 can be used by the processing system 102 to allocate storage devices for a file distribution operation. The allocation routine 111 can transmit allocation requests to storage devices and can receive allocation responses from the storage devices. In response to the allocation responses, the file distribution system 100 can select from available storage devices and can notify the file source of which storage devices are being used for the file distribution.

The block-forming routine 112 is an optional routine and can be used by the processing system 102 to form at least portions of an incoming file into blocks of data. A block of data structure can be used in order to generate file portions that include non-sequential bits of information, i.e., the dividing can comprise vertically slicing sequential rows of data to create slices of non-sequential bits, bytes, etc. The block of data can be formed by transforming sequential segments of an incoming bitstream into rows, into columns, or scrambled according to some predetermined pattern (see FIG. 2).

The dividing routine 113 divides at least part of the incoming file into the file portions for distribution. If the file is large, or conversely if the file portions are small, or both, then only part of the file can be divided into file portions and distributed, wherein the file is iteratively divided and the resulting file portions are distributed in order to distribute the entire file. The dividing routine 113 can divide by simply distributing and sending bits, bytes, words, etc., of file data to various separate storage devices. Alternatively, the dividing routine 113 can operate on a structure of data, such as the block of data formed by the block-forming routine 112. The dividing routine 113 can slice the block of data, such as by vertically slicing the block of data, diagonally slicing the data, slicing the data according to a predetermined pattern, etc.

The distribution characteristics 120 include variables and/or constant values that specify the file distribution operation. The distribution characteristics 120 can hold the variables and/or constant values for a current distribution operation or for one or more distribution operations. The dividing and distributing operations can be configured and controlled according to the distribution characteristics 120. The distribution characteristics 120 can include the number of storage devices, the locations/addresses of the storage devices, a number of file portions, and the size of the file portions, such as a number of bits in a file portion, for example. In addition, the characteristics can include a block-forming pattern, a block size (where the file is formed into one or more blocks of data), a number of slices per block, a slice size, and a slice orientation or pattern (such as vertical, diagonal, horizontal, etc.), for example.

The storage device IDs 121 comprises a storage of identifiers of the storage devices being used for a distribution operation. The storage device IDs 121 can accumulate storage device IDs during an allocation process or during the distributing process. Multiple storage device IDs can be stored in the storage device IDs 121, corresponding to the number of storage devices to be employed (see discussion above).

The file portion IDs 122 comprise identifiers of the file portions sent to the storage devices. Multiple file portion IDs can be stored in the file portion IDs 122, corresponding to the number of file portions generated by the dividing operation. During the file distribution, the file portion IDs 122 can accumulate all file portion IDs, whereupon the file portion IDs (along with the storage device IDs) can be sent to the file source upon completion of the file distribution. The file portion IDs 122 and the storage device IDs can therefore be used to generate the distribution information that is sent to the file source. As a result, only the file source has the information necessary to retrieve the file portions and re-create the file.

In one embodiment, the storage device IDs 121 and the file portion IDs 122 comprise storage tags. The storage tags can be stored on the file distribution system 100 or can be transmitted to the file source. The storage tags can store information needed to retrieve the file portions and re-assemble the original file.

Figure 2:
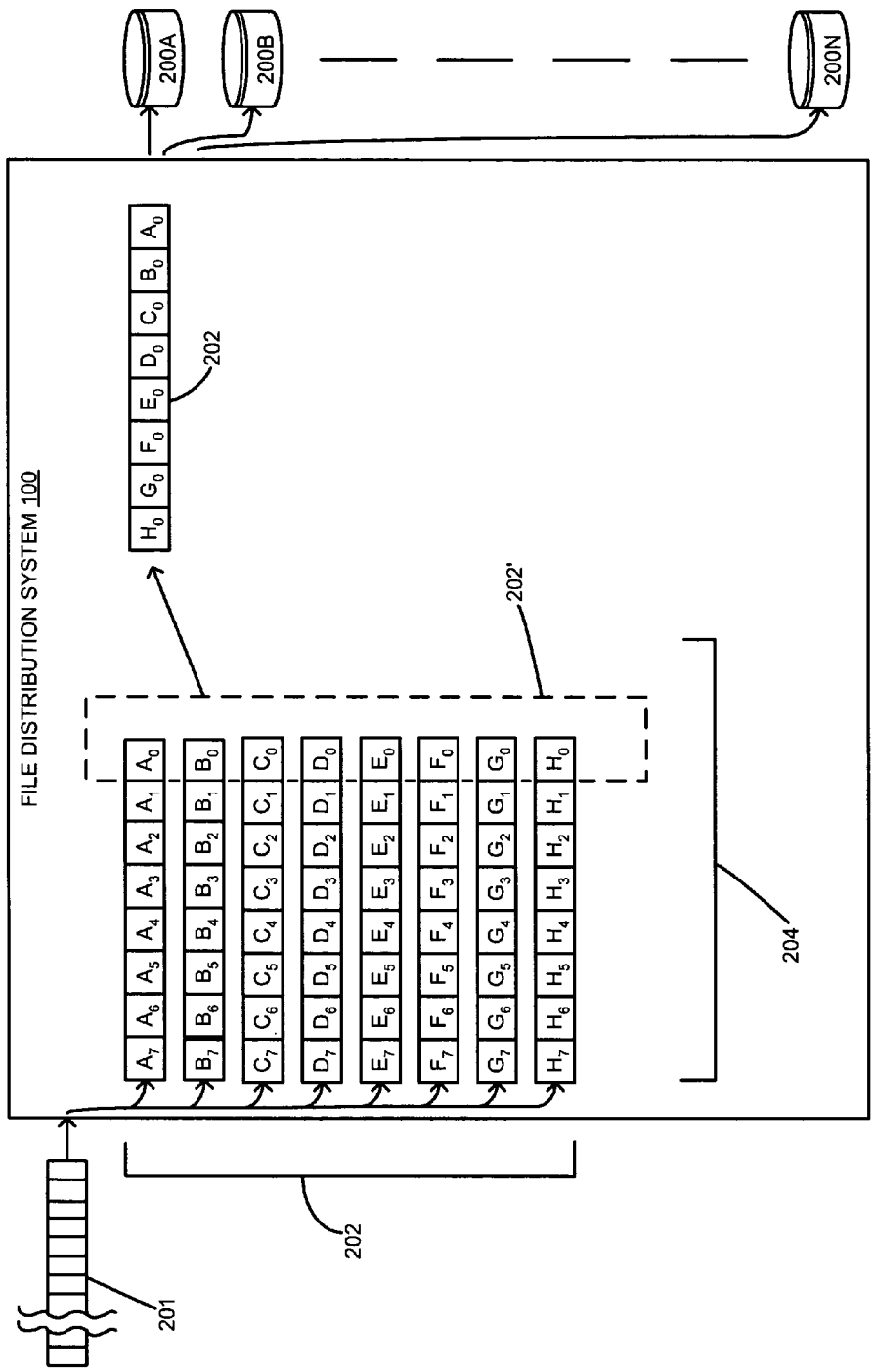
FIG. 2 is a data flow diagram that illustrates the file distribution operation.

FIG. 2 is a data flow diagram that illustrates the file distribution operation. The file distribution system 100 receives a file 201, shown as the file input on the left side of the figure. The file 201 can comprise any data and can be of any size. The file distribution system 100 divides the file 201 into two or more file portions 202. In one embodiment, the dividing process can comprise segmenting the incoming data stream and distributing the sequentially data to various storage devices. In this embodiment, an outgoing file portion therefore would comprise bits $A_7A_6A_5A_4A_3A_2A_1A_0$, for example.

Alternatively, the dividing process can comprise forming a block of data 204 for the dividing operation, wherein the dividing comprises slicing off portions of the block of data 204. In one embodiment, the block of data 204 is vertically sliced, as shown by the dashed box 202' around the rightmost column of the block of data 204, wherein the dashed box 202' denotes one vertical slice. The resulting file slice, if not performed similarly to the block forming process, results in non-sequential bits being in the file slice, such as the file portion $H_0G_0F_0E_0D_0C_0B_0A_0$, as shown. Alternatively, the file portion can comprise $A_0B_0C_0D_0E_0F_0G_0H_0$. This provides greater randomness and security to the file distribution. Each file portion 202' that is sliced off of the block of data 204 in this embodiment is sent to a different storage device.

If the file 201 is large, or if the block size is small, then the file 201 is iteratively formed into blocks of data 204, sliced, and distributed. Each storage device therefore receives multiple file portion slices 202', and each storage device receives one slice 202' (i.e., one column) for each block of data 204. In any embodiment, a resulting file portion 202 is sent to one storage device of the storage devices 200A-200N. If the file 201 is large, then the file 201 is iteratively divided and distributed. Each subsequent file portion is sent to a subsequent storage device 200, wherein the file portions 202 are distributed to a plurality of storage devices 200A-200N.

The slicing can comprise vertically slicing the block of data, as shown in FIG. 2. The slicing can proceed from the most significant bit (i.e., the left side) of the block of data 204, from the least significant bit of the block of data 204, or in any desired pattern. Likewise, the slicing can comprise vertical slicing of individual rows of the block of data 204, can comprise diagonal slicing, can comprise horizontal slicing (where the block of data 204 is formed by columns instead of by rows), or can comprise slicing according to any desired pattern. The slicing can comprise slicing off a single column of bits, multiple columns of bits per slice, or any desired number.

The sliced data is distributed among the storage devices 200A-200N, wherein the file 201 is distributed in a manner to provide security from copying or theft. The resulting file portions 202, being spread within and among storage devices, are difficult to find, assemble, and read or retrieve.

The storage devices 200A-200N can comprise any manner of device capable of storing digital data. The storage devices 200A-200N can comprise general computer devices, as shown, or can comprise specialized storage devices such as databases, redundant arrays of inexpensive disks (RAID devices), storage area networks, etc.

In one embodiment, location information concerning the file portions 202 and the applicable storage devices is transmitted to the file source. Consequently, only the file source can retrieve all of the file portions 202 and rebuild the file 201. Alternatively, the location information can be held by the file distribution system 100 (or associated storage system).

The number of file portions produced during the file distribution can depend on factors such as the size of the file, the number of storage devices available for storage, the desired level of security, the processing time needed to divide and distribute the file, etc. In addition, the number of bits in a file portion can also be varied. It should be understood that the fewer the number of bits in a file portion, the higher resulting level of security, as a file will be more finely distributed between storage devices and within a particular storage device (i.e., breaking the file 201 into larger lumps of data and distributing them between only a couple of storage devices will provide less security that breaking the file 201 into very small lumps of data and scattering them through many storage devices). However, dividing the file 201 into a file portion having only a small number of bits will increase the processing time needed in order to divide and distribute the file 201.

Figure 3:
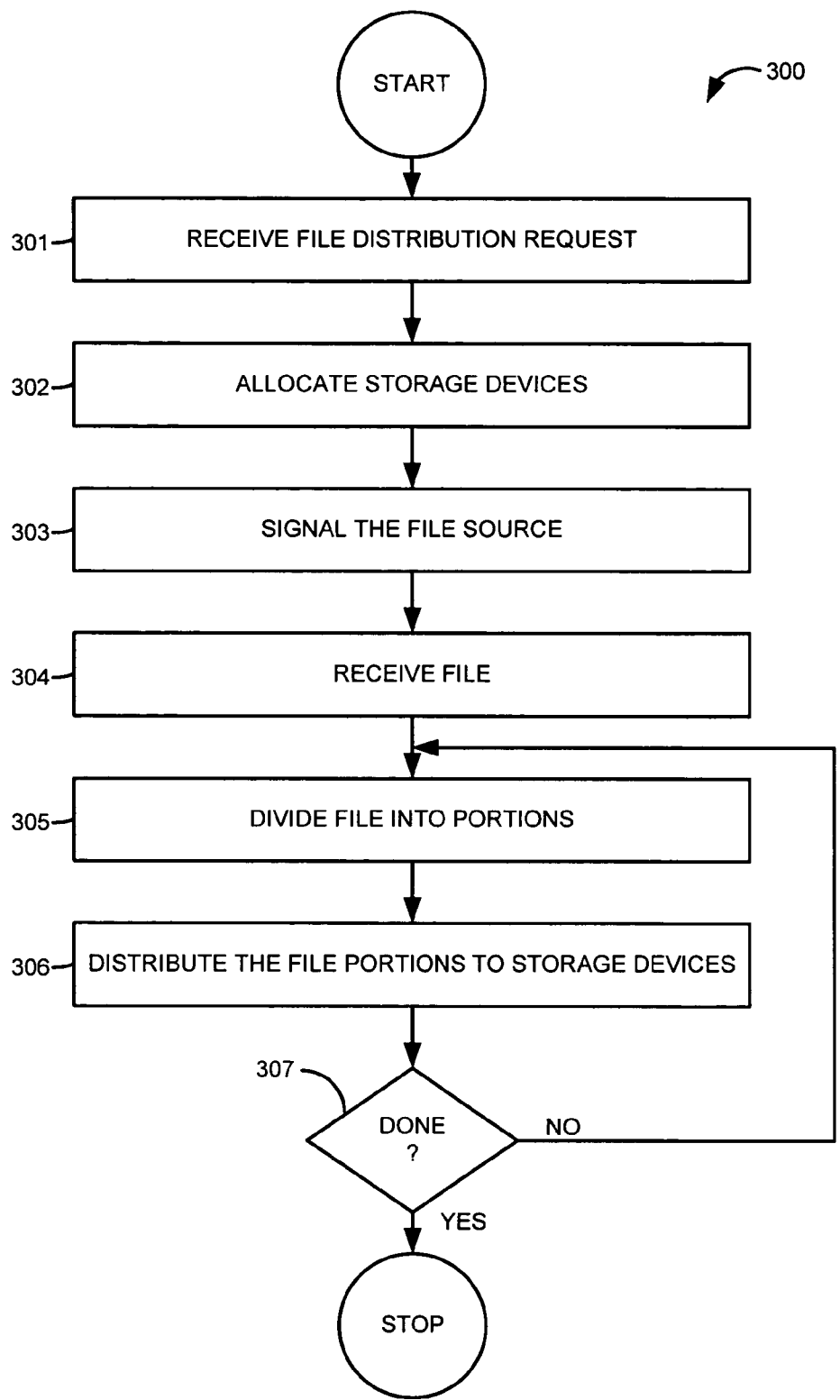
FIG. 3 is a flowchart of a file distribution method according to an embodiment of the invention.

FIG. 3 is a flowchart 300 of a file distribution method according to an embodiment of the invention. In step 301, a file distribution request is received from the file source. The file distribution request initiates the file distribution operation.

In step 302, storage devices are allocated. The allocation can include determining which storage devices are available for the file distribution operation from among a plurality of storage devices. The allocation process therefore can include issuing an allocation message to all available storage devices, with the allocation message prompting the storage devices to respond with some manner of availability report. In addition, the allocation can include selection of a desired number of storage devices from among the available storage devices.

In one embodiment, the allocation step can optionally allocate multiple sets of storage devices, wherein the data is duplicated across a first storage device set and a second storage device set, for example. As a result, for the purpose of backup security, the set of file portions can be duplicated across two or more sets of storage devices, wherein a backup copy will exist on a secondary storage device(s) if the primary storage device fails or is corrupted. It should be noted that the backup copy will feature the same security characteristics as a primary copy.

In step 303, the file source is signaled to transmit the file, or at least a portion of the file. It should be understood that the file source can be signaled to send portions of the file, such as portions of a size of a block of data, wherein the file is iteratively processed by dividing and distributing a block of data and then requesting a next block of data. The signaling can further include transmitting the corresponding storage device IDs to be retained by the file source for future retrieval and re-assembly of the file.

In step 304, a file 201 is received from the file source.

In step 305, at least part of the file 201 is divided into two or more file portions. The dividing can be performed in various sizes and ways, as previously described.

In step 306, the two or more file portions are distributed to two or more corresponding storage devices. Each storage device of the two or more storage devices is separate from all other storage devices of the two or more storage devices. In one embodiment, the number of storage devices can correspond to the number of file portions. Alternatively, the number of file portions can exceed the number of storage devices, wherein each storage device stores multiple file portions. In one embodiment, a total number of file portions is greater than a number of storage devices in the two or more storage devices. Consequently, a storage device of the two or more storage devices stores two or more non-contiguous file portions.

In an optional step 307, if the file distribution is not done, i.e., if the file has not been completely divided and distributed, then the method loops back to step 305 for further dividing and distributing operations. If the file distribution is done, the method is complete.

Figure 4:
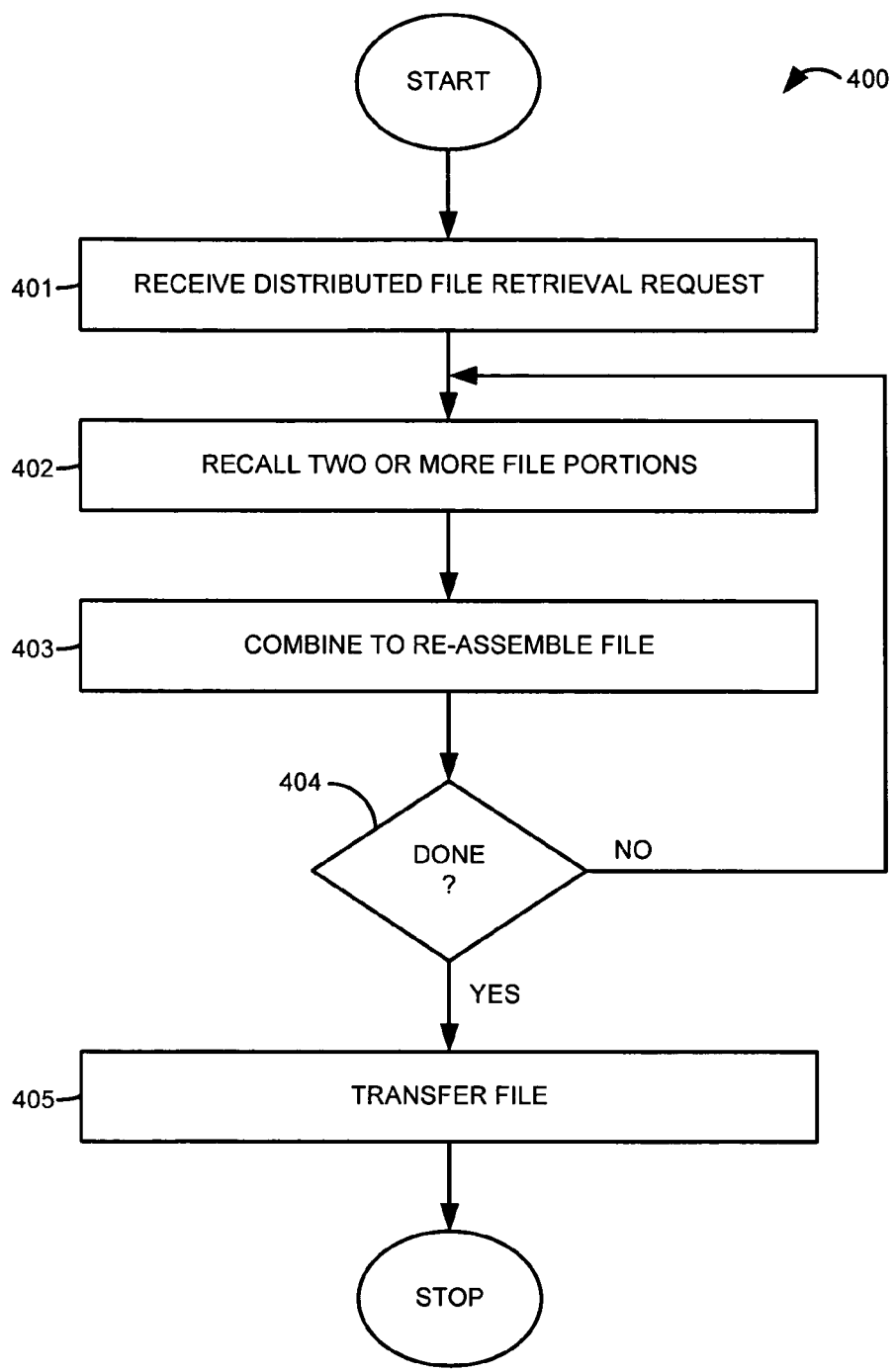
FIG. 4 is a flowchart of a file re-assembly method according to an embodiment of the invention.

FIG. 4 is a flowchart 400 of a file re-assembly method according to an embodiment of the invention. The file re-assembly is the converse of the file distribution, and retrieves and re-assembles distributed file portions. In step 401, a distributed file retrieval request is received from the file source, requesting the file that was previously distributed. The distributed file retrieval request can be received at any time, and can include any necessary information for retrieving and re-assembling the file. In one embodiment, the distributed file retrieval request includes the storage tags, wherein each storage tag includes one or more storage device IDs and one or more file portion IDs. The storage device IDs and the file portion IDs are used to recall and re-assemble the distributed file portions. Alternatively, in another embodiment the distributed file retrieval request includes information that is used to retrieve the storage device IDs and the file portion IDs for the file, with the storage device IDs and the file portion IDs being stored on the file distribution system 100 or being stored on some associated storage system.

In step 402, two or more file portions are recalled. Each file portion is recalled from an appropriate, separate storage device.

In step 403, the recalled two or more file portions are combined in order to re-assemble the file. The recalled two or more file portions can comprise the entire file, or can comprise at least a portion of the file.

In step 404, if the re-assembly is done, the method proceeds to step 405; otherwise the method branches back to step 402 and iteratively recalls and combines file portions.

In step 405, the re-assembled file is transferred to the file source that sent the distributed file retrieval request. In one embodiment, the retrieved file portions are removed from the storage devices. Alternatively, in another embodiment, the retrieved file portions remain on the storage devices until some manner of delete or erase command is sent to the storage devices specifying the file portions to be deleted or erased.

FIG. 5 is a flowchart 500 of a file distribution method according to an embodiment of the invention. In step 501, a file distribution request is received from the file source, as previously described.

In step 502, storage devices are allocated, as previously described.

In step 503, the file source is signaled to transmit the file, as previously described.

In step 504, a file 201 is received from the file source.

In step 505, a block of data is formed from at least a portion of the file. The block of data in one embodiment comprises an M×N block of data, including M rows and N columns. The number of rows M can be equal to the number of columns N, or the number of rows and columns can differ. The number of rows M can correspond to the number of bits desired to be in a particular file slice. For example, where the file is organized by 8-bit sets (i.e., organized by bytes), the block of data can comprise an 8×8 block, wherein eight storage devices are used for the file distribution operation and where each slice (i.e., each column) contains 8 bits. The number of columns N can correspond to the number of storage devices 220A-220N. It should be understood, however, that M and N can comprise other row and column sizes.

In step 506, the file 201 is divided into two or more file portions, as previously described.

In step 507, the two or more file portions are distributed to one or more storage devices, as previously described.

In step 508, the corresponding file portion IDs are stored. As previously discussed, the file portion IDs can be sent to the file source, and can be retained by the file source for future retrieval and re-assembly of the file. Alternatively, the file portion IDs can be stored by the file distribution system 100. It should be understood that although the flowchart 500 shows the file portion IDs being processed after the distribution of the file portions, the order is not significant and the file portion IDs can be processed at any time after a dividing step, including after completion of the file distribution operation.

In an optional step 509, if the file distribution is not done, i.e., if the file has not been completely divided and distributed, then the method loops back to step 505 for further forming, dividing, and distributing operations. If the file distribution is done, the method is complete.

Figure 6:
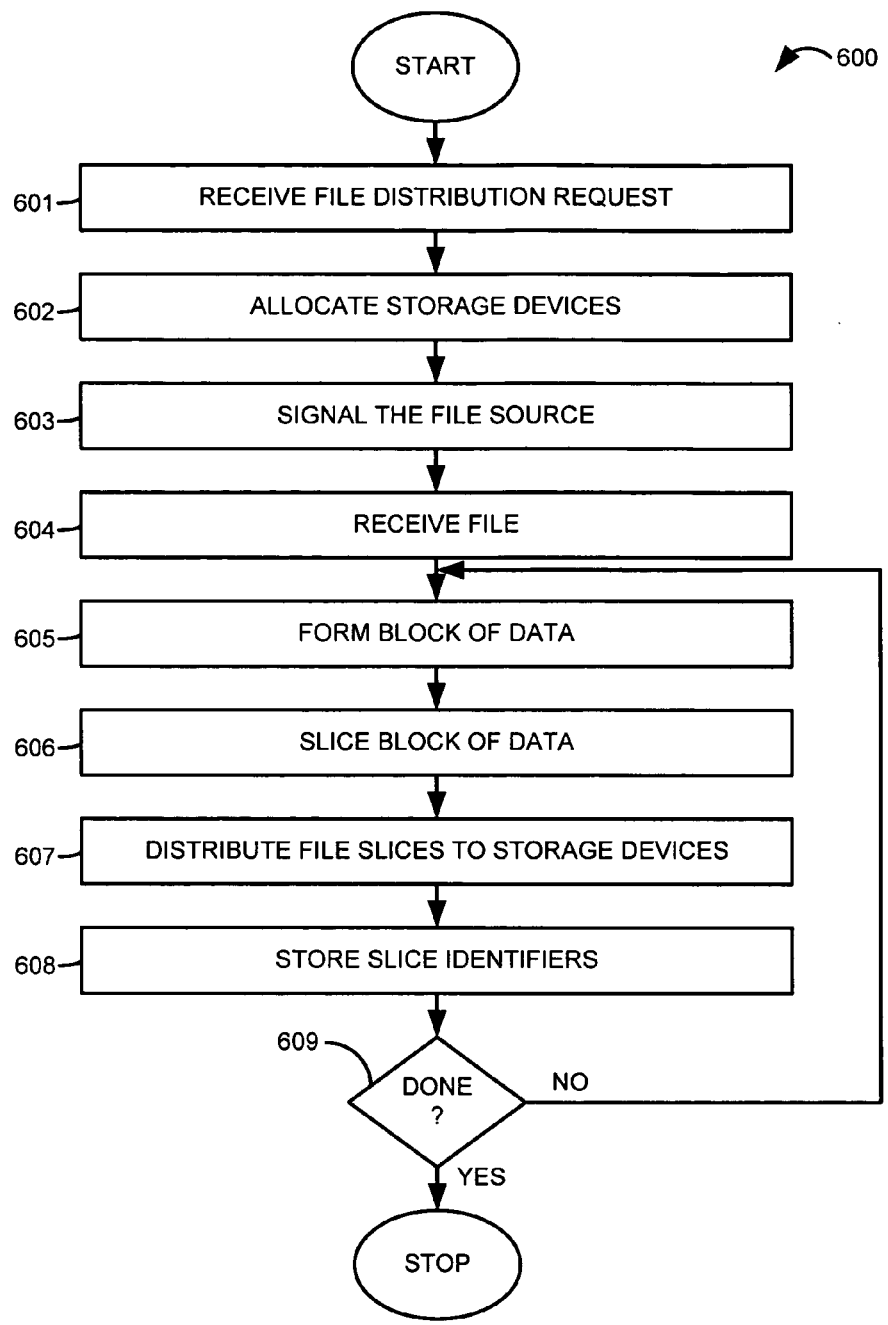
FIG. 6 is a flowchart of a file distribution method according to an embodiment of the invention.

FIG. 6 is a flowchart 600 of a file distribution method according to an embodiment of the invention. In step 601, a file distribution request is received from the file source, as previously described.

In step 602, storage devices are allocated, as previously described.

In step 603, the file source is signaled to transmit the file, as previously described.

In step 604, a file 201 is received from the file source.

In step 605, a block of data is formed from at least a portion of the file 201, as previously described.

In step 606, the file 201 is sliced into two or more file slices. The file slices can comprise file portions. The slicing can comprise vertically slicing the block of data, as shown in FIG. 2. The slicing can proceed from the most significant bit (i.e., the left side) of the block of data 204, from the least significant bit of the block of data 204, or in any desired pattern. Likewise, the slicing can comprise vertical slicing of individual rows of the block of data 204, can comprise diagonally slicing, or can comprise slicing according to any desired pattern. The slicing can comprise slicing off a single column of bits, multiple columns of bits per slice, or any desired number.

In step 607, the two or more file slices are distributed to one or more storage devices, as previously described.

In step 608, the corresponding file portion/slice IDs are stored, as previously discussed.

In an optional step 609, if the file distribution is not done, then the method loops back to step 605 for further forming, slicing, and distributing operations. If the file distribution is done, the method is complete.

Figure 7:
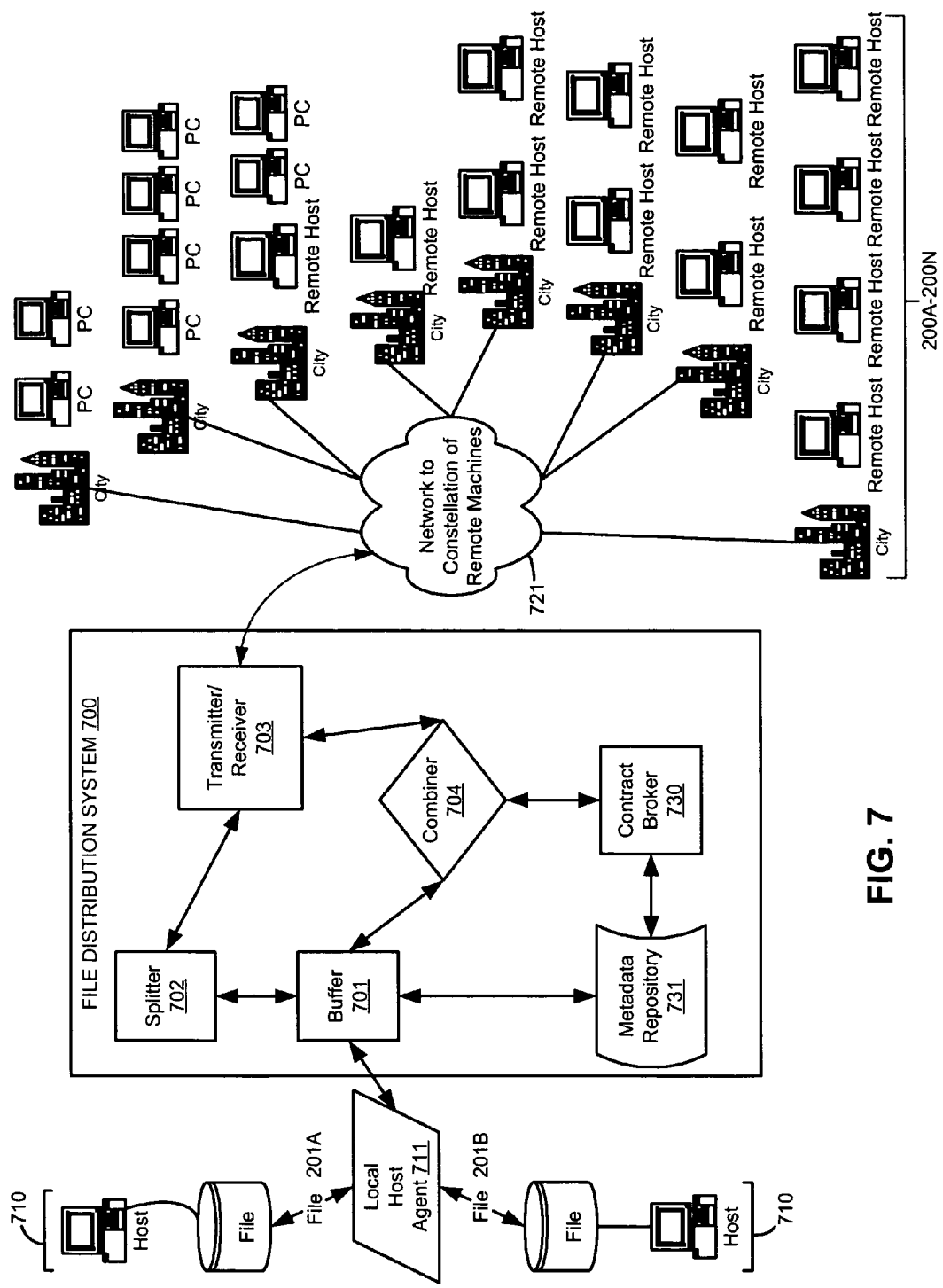
FIG. 7 shows a file distribution system according to an embodiment of the invention.

FIG. 7 shows a file distribution system 700 according to an embodiment of the invention. The file distribution system 700 can include a buffer 701, a splitter 702, a transmitter/receiver 703, and a combiner 704. The file distribution system 700 is configured to receive a file 201 from a client device 710 into the buffer 701, to divide the file 201 into file portions in the splitter 702, and to distribute the file portion to two or more storage devices 200 through the transmitter/receiver 703.

The file distribution system 700 is further configured to receive a distributed file retrieval request from a client device 710 in the buffer 701. The distributed file retrieval request can include storage tags that contain retrieval information, or the request can include retrieval information that causes the file distribution system 700 to retrieve the storage tags. The file distribution system 700 is further configured to generate a recall message or messages in the combiner 704 based on the storage tags, to send the recall messages to appropriate storage devices 200 through the transmitter/receiver 703, to receive file portions from the appropriate storage devices 200 through the transmitter/receiver 703, re-assemble the file portions into the file in the combiner 704, and transfer the re-assembled file to the requesting client device 710 through the buffer 701.

The file distribution system 700 can transfer files to and from a client device 710. The file distribution system 700 can communicate with one or more client devices 710, wherein the client devices 710 are file sources. The file distribution system 700 can communicate directly with the client devices 710, or can communicate through some manner of host agent 711, as shown.

The file distribution system 700 can transfer file portions to and from storage devices 200A-200N. The file distribution system 700 in one embodiment communicates with the storage devices 200A-200N through a network 721, as shown. The network 721 can comprise a private network, a public network, or the Internet, for example. Alternatively, in some embodiments the transmitter/receiver 703 of the file distribution system 700 can directly communication with the storage devices 200A-200N.

The file distribution system 700 can additionally include devices that enable the file distribution system 700 to be accessed only by prescribed users. In one embodiment, access to the file distribution system 700 can be based on a subscription or contract, for example. The file distribution system 700 therefore can optionally include a contract broker 730 and a metadata repository 731. The contract broker 730 can store user information that is used by the file distribution system 700 to grant or deny access to a user. The metadata repository 731 can store data regarding a divided and distributed file. For example, the metadata repository 731 in one embodiment stores information that, when accessed with the proper storage tags, can be used to recall and re-assemble a file. In an alternative embodiment, the metadata repository 731 stores sets of storage tags.

The file distribution according to the invention can be employed according to any of the embodiments in order to provide several advantages, if desired. The invention can advantageously distribute the data in a file across several independent and separate storage devices. The invention can provide increased data security by distributing the file across storage devices. It should be understood that distributing a file over a larger set of storage devices increases the redundancy and safety of the stored information. The invention is simple and easy to use. The invention does not increase the size of the file. The invention can provide fast and economical file security. Multiple files can be entrained in one transmission session to the remote machines. The invention can provide a high level of file security. The invention can provide varying levels of file security. The invention can provide varying levels of file security by varying the size of the file portions. The invention can provide varying levels of file security by varying the number of storage devices. The invention can provide varying levels of file security by varying the physical and/or geographical separation of the storage devices. The invention can provide redundancy in file security. The invention can provide data security without encryption, and without the need for an encryption key or encryption seed.

A storage device can comprise a server, a personal computer (PC), or other computing element that contains the resources to store and retrieve information. In one embodiment, personal digital assistants (PDAs), telephone handsets or cellular telephones, or other wireless devices can be employed for providing storage and retrieval according to the invention.

This method provides reliable security for a file as long as all of the appropriate storage devices are not captured or controlled. In the event that one or several storage devices are stolen or compromised, no information will be able to be extracted from the stolen hardware without the storage tags that describe the location of all of the file portions. In one embodiment, the invention can be implemented wherein only one bit of any given word is contiguously stored on a particular storage device. In this embodiment, at least eight storage devices would have to be compromised in order to retrieve and re-assemble a file. However, it would be almost impossible to determine which eight storage devices would contain the appropriate file portions comprising any given file. In one embodiment, only the originating client knows the identity of the storage devices containing the constituent parts of its files. In one embodiment, the invention can be implemented wherein only the controlling server (such as a secure, privately operated server) has information about and can access the remote storage devices for data retrieval.

Clients for the file distribution include corporations, institutions, and agencies that desire to store vital information in scattered, remote sites. The invention can employ any available network transport to access the storage devices. The file portions can be transported over a private network, a public network, or the Internet, for example. However, in one embodiment, the invention can be implemented wherein no single session transport holds recognizable information.

What is claimed is:

1. A file distribution system, comprising:
   a communication interface configured to communicate with a plurality of storage devices, to receive a file from a file source, receive a file distribution request from the file source before receiving the file, and to transfer two or more file portions to two or more storage devices of the plurality of storage devices; and a processing system comprising at least one processing device, wherein the processing system is coupled to the communication interface, with the processing system being configured to, in response to the file distribution request, allocate the two or more storage devices for use in distributively storing the file before receiving the file, signal the file source through the communication interface to send the file for distribution, receive the file from the communication interface, divide only a part of the file into the two or more file portions, send two or more file portion identifiers to the file source through the communication interface, with the two or more file portion identifiers corresponding to the two or more file portions after the dividing, and distribute the two or more file portions to the two or more storage devices through the communication interface, with the two or more storage devices corresponding to the two or more file portions and wherein each storage device of the two or more storage devices is separate from all other storage devices of the two or more storage devices, wherein the processing system is further configured to iteratively divide and distribute the file.

2. The system of claim 1, further comprising a buffer configured to receive and hold the file received from the communication interface for communication to the processing system.

3. The system of claim 1, further comprising a buffer configured to receive and hold the two or more file portions received from the processing system for communication to the communication interface.

4. The system of claim 1, wherein the each storage device is geographically separate from the all other storage devices.

5. The system of claim 1, wherein each file portion of the two or more file portions is of an equal size.

6. The system of claim 1, wherein the file is divided into a plurality of file portions, with a number of file portions in the plurality of file portions being greater than a number of storage devices in the two or more storage devices, and wherein a storage device of the two or more storage devices stores two or more non-contiguous file portions.

7. The system of claim 1, with the processing system being further configured to form at least a portion of the file into a block of data by transforming sequential sections of the at least a portion of the file into a plurality of rows of the block of data before the dividing, and with the dividing comprising slicing the file.

8. The system of claim 1, with the processing system being further configured to form at least a portion of the file into a block of data by transforming sequential sections of the at least a portion of the file into a plurality of rows of the block of data before the dividing, and with the dividing comprising vertically slicing the file.

9. The system of claim 1, with the processing system being further configured to send file portion identifiers to the file source after the dividing, with the file portion identifiers corresponding to the two or more file portions.

10. The system of claim 1, with the processing system being further configured to transmit identifiers of the two or more storage devices to the file source after the allocating.

11. The system of claim 1, with the processing system being further configured to:
generate a corresponding storage tag for a storage device of the two or more storage devices after the allocating, wherein the storage tag is unique and identifies the corresponding storage device; and
transmit the storage tag to the file source.

12. The system of claim 1, with the processing system being further configured to:
form at least a portion of the file into a block of data;
with the dividing further comprising slicing the block of data into two or more file slices corresponding to the two or more storage devices;
with the distributing comprising distributing the two or more file slices to the two or more storage devices; and
send file slice identifiers to the file source corresponding to the two or more file slices.

13. The system of claim 1, with the processing system being further configured to:
generate two or more storage tags corresponding to the two or more storage devices;
add two or more file portion identifiers to the two or more corresponding storage tags after the dividing;
iteratively divide and distribute the file until the file is completely distributed; and
transmit the two or more storage tags to the file source after completion of the dividing and distributing steps.

14. The system of claim 1, with the processing system being further configured to:
receive a distributed file retrieval request from the file source;
recall the two or more file portions from the two or more storage devices;
combine the two or more file portions in order to re-assemble at least a portion of the file; and
transfer the file to the file source.

15. A file distribution method, comprising:
receiving a file distribution request from a file source before receiving a file;
in response to the file distribution request, allocating two or more storage devices for use in distributively storing the file before receiving the file;
signaling the file source to send the file for distribution;
receiving the file from the file source;
dividing only a part of the file into two or more file portions;
sending two or more file portion identifiers to the file source after the dividing, with the two or more file portion identifiers corresponding to the two or more file portions;
distributing the two or more file portions to two or more corresponding storage devices, wherein each storage device of the two or more storage devices is separate from all other storage devices of the two or more storage devices; and
iteratively dividing and distributing the file.

16. The method of claim 15, wherein the each storage device is geographically separate from the all other storage devices.

17. The method of claim 15, wherein each file portion of the two or more file portions is of an equal size.

18. The method of claim 15, with a total number of file portions being greater than a number of storage devices in the two or more storage devices, and wherein a storage device of the two or more storage devices stores two or more non-contiguous file portions.

19. The method of claim 15, further comprising before the dividing forming at least a portion of the file into a block of data by transforming sequential sections of the at least a portion of the file into a plurality of rows of the block of data, and with the dividing comprising slicing the file.

20. The method of claim 15, further comprising before the dividing forming at least a portion of the file into a block of data by transforming sequential sections of the at least a portion of the file into a plurality of rows of the block of data, and with the dividing comprising vertically slicing the file.

21. The method of claim 15, further comprising after the dividing sending file portion identifiers to the file source, with the file portion identifiers corresponding to the two or more file portions.

22. The method of claim 15, with the allocating further comprising transmitting identifiers of the two or more storage devices to the file source.

23. The method of claim 15, with the allocating further comprising:
generating a corresponding storage tag for a storage device of the two or more storage devices, wherein the storage tag is unique and identifies the corresponding storage device; and
transmitting the storage tag to the file source.

24. The method of claim 15, further comprising:
forming at least a portion of the file into a block of data;
with the dividing comprising slicing the block of data into two or more file slices corresponding to the two or more storage devices;
with the distributing comprising distributing the two or more file slices to the two or more storage devices; and
sending file slice identifiers to the file source corresponding to the two or more file slices.

25. The method of claim 15, further comprising:
generating two or more storage tags corresponding to the two or more storage devices;
adding two or more file portion identifiers to the two or more corresponding storage tags after the dividing;
iteratively dividing and distributing the file until the file is completely distributed; and
transmitting the two or more storage tags to the file source after completion of the dividing and distributing steps.

26. The method of claim 15, further comprising:
receiving a distributed file retrieval request from the file source;
recalling the two or more file portions from the two or more storage devices;
combining the two or more file portions in order to re-assemble at least a portion of the file; and
transferring the file to the file source.

27. A file distribution method, comprising:
receiving a file distribution request from a file source before receiving a file;
in response to the file distribution request, allocating two or more storage devices for use in distributively storing the file before receiving the file;
signaling the file source to send the file for distribution;
receiving the file from the file source;
forming only a portion of the file into a block of data;
dividing the block of data into two or more file portions;
sending two or more file portion identifiers to the file source after the dividing, with the two or more file portion identifiers corresponding to the two or more file portions;
distributing the two or more file portions to two or more corresponding storage devices, wherein each storage device of the two or more storage devices is separate from all other storage devices of the two or more storage devices; and
iteratively dividing and distributing the file.

28. The method of claim 27, wherein the each storage device is geographically separate from the all other storage devices.

29. The method of claim 27, wherein each file portion of the two or more file portions is of an equal size.

30. The method of claim 27, wherein the file is divided into a plurality of file portions, with a number of file portions in the plurality of file portions being greater than a number of storage devices in the two or more storage devices, and wherein a storage device of the two or more storage devices stores two or more non-contiguous file portions.

31. The method of claim 27, further comprising forming the block of data by transforming sequential sections of the at least a portion of the block of data into a plurality of rows of the block of data.

32. The method of claim 27, further comprising after the dividing sending file portion identifiers to the file source, with the file portion identifiers corresponding to the two or more file portions.

33. The method of claim 27, with the dividing comprising slicing the block of data.

34. The method of claim 27, with the dividing comprising vertically slicing the block of data.

35. The method of claim 27, with the allocating further comprising transmitting identifiers of the two or more storage devices to the file source.

36. The method of claim 27, with the allocating further comprising:
generating a corresponding storage tag for a storage device of the two or more storage devices, wherein the storage tag is unique and identifies the corresponding storage device; and
transmitting the storage tag to the file source.

37. The method of claim 27, further comprising:
generating two or more storage tags corresponding to the two or more storage devices;
adding two or more file portion identifiers to the two or more corresponding storage tags after the dividing;
iteratively forming, dividing, and distributing the file until the file is completely distributed; and
transmitting the two or more storage tags to the file source after completion of the dividing and distributing steps.

38. The method of claim 27, further comprising:
receiving a distributed file retrieval request from the file source;
recalling the two or more file portions from the two or more storage devices;
combining the two or more file portions in order to re-assemble at least a portion of the file; and
transferring the file to the file source.

39. A file distribution method, comprising:
receiving a file distribution request from a file source before receiving a file;
in response to the file distribution request, allocating two or more storage devices for use in distributively storing the file before receiving the file;
signaling the file source to send the file for distribution;
receiving the file from the file source;
forming only a portion of the file into a block of data;
slicing the block of data into two or more file slices corresponding to the two or more storage devices; and sending two or more file slice identifiers to the file source after the slicing, with the two or more file slice identifiers corresponding to the two or more file slices;

distributing the two or more file slices to the two or more storage devices, wherein each storage device of the two or more storage devices is separate from all other storage devices of the two or more storage devices; and iteratively forming, slicing, and distributing the file.

40. The method of claim 39, wherein the each storage device is geographically separate from the all other storage devices.

41. The method of claim 39, wherein each file slice of the two or more file slices is of an equal size.

42. The method of claim 39, wherein the file is sliced into a plurality of file slices, with a number of file slices in the plurality of file slices being greater than a number of storage devices in the two or more storage devices, and wherein a storage device of the two or more storage devices stores two or more non-contiguous file slices.

43. The method of claim 39, further comprising forming the block of data by transforming sequential sections of the at least a portion of the block of data into a plurality of rows of the block of data.

44. The method of claim 39, further comprising after the slicing sending two or more file slice identifiers to the file source, with the two or more file slice identifiers corresponding to the two or more file slices.

45. The method of claim 39, with the slicing comprising vertically slicing the block of data.

46. The method of claim 39, with the allocating further comprising transmitting identifiers of the two or more storage devices to the file source.

47. The method of claim 39, with the allocating further comprising:

generating a corresponding storage tag for a storage device of the two or more storage devices, wherein the storage tag is unique and identifies the corresponding storage device; and transmitting the storage tag to the file source.

48. The method of claim 39, further comprising:

generating two or more storage tags corresponding to the two or more storage devices;

adding two or more file slice identifiers to the two or more corresponding storage tags after the slicing;

iteratively forming, slicing, and distributing the file until the file is completely distributed; and transmitting the two or more storage tags to the file source after completion of the slicing and distributing steps.

49. The method of claim 39, further comprising:

receiving a distributed file retrieval request from the file source;

recalling the two or more file portions from the two or more storage devices;

combining the two or more file portions in order to re-assemble the file; and transferring the file to the file source.

* * * * *